(12) United States Patent
Scholtes et al.

(10) Patent No.: US 11,105,262 B2
(45) Date of Patent: Aug. 31, 2021

(54) TURBOMACHINE COMPRISING AN AIR COLLECTION CIRCUIT

(71) Applicant: SAFRAN AIRCRAFT ENGINES, Paris (FR)

(72) Inventors: Christophe Scholtes, Moissy-Cramayel (FR); Ulysse Jacques Bernard Danteny, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/053,689

(22) PCT Filed: Apr. 16, 2019

(86) PCT No.: PCT/EP2019/059847
§ 371 (c)(1),
(2) Date: Nov. 6, 2020

(87) PCT Pub. No.: WO2019/214915
PCT Pub. Date: Nov. 14, 2019

(65) Prior Publication Data
US 2021/0071578 A1 Mar. 11, 2021

(30) Foreign Application Priority Data
May 9, 2018 (FR) ...................................... 1853971

(51) Int. Cl.
*F02C 6/08* (2006.01)
*F01D 5/08* (2006.01)
(Continued)

(52) U.S. Cl.
CPC ................ *F02C 6/08* (2013.01); *F01D 5/082* (2013.01); *F01D 5/12* (2013.01); *F04D 29/321* (2013.01);
(Continued)

(58) Field of Classification Search
CPC ... F02C 6/08; F01D 5/082; F01D 5/12; F04D 29/321; F04D 29/582; F05D 2240/126; F05D 2260/20
See application file for complete search history.

(56) References Cited

U.S. PATENT DOCUMENTS 3,832,089 A * 8/1974 Moellmann ........... F04D 29/441
  415/207
4,264,274 A * 4/1981 Benedict ................. F01D 11/08
  415/126
(Continued)

FOREIGN PATENT DOCUMENTS

DE  112015002664 T5  2/2017
EP     1262630 A1    12/2002
(Continued)

OTHER PUBLICATIONS

Search Report from French Intellectual Property Office on corresponding FR application (FR 1853971) dated Oct. 16, 2018.
(Continued)

*Primary Examiner* — Michael Lebentritt
(74) *Attorney, Agent, or Firm* — Klein, O'Neill & Singh, LLP

(57) ABSTRACT

The invention relates to a turbine engine extending longitudinally along an X axis and including a main duct in which an air stream flows, the turbine engine including at least one upstream compressor disc, at least one downstream compressor disc and a circuit for collecting air from an air stream collected in the main duct, the air collection circuit including a radial portion in which at least one air collection tube is mounted and a longitudinal portion extending between a cylindrical body and a central bore of the downstream compressor disc. The turbine engine includes a plurality of blades extending in the longitudinal portion of the air
(Continued)

collection circuit, configured to be rotated about the X axis, in order to rotate the collected air stream.

10 Claims, 4 Drawing Sheets

(51) Int. Cl.
    *F01D 5/12*       (2006.01)
    *F04D 29/32*     (2006.01)
    *F04D 29/58*     (2006.01)

(52) U.S. Cl.
    CPC ...... *F04D 29/582* (2013.01); *F05D 2240/126* (2013.01); *F05D 2260/20* (2013.01)

(56) References Cited

U.S. PATENT DOCUMENTS

| | | | |
|---|---|---|---|
| 6,823,676 B2* | 11/2004 | Conete | F23R 3/60 |
| | | | 60/796 |
| 2006/0222485 A1* | 10/2006 | Lardellier | F04D 29/324 |
| | | | 415/115 |
| 2009/0092753 A1* | 4/2009 | Carlin | C23C 10/06 |
| | | | 427/237 |
| 2011/0076135 A1* | 3/2011 | Gendraud | F01D 11/24 |
| | | | 415/119 |
| 2012/0107133 A1* | 5/2012 | Bulin | B64D 15/04 |
| | | | 416/96 R |
| 2015/0071768 A1* | 3/2015 | Hugon | F04D 29/563 |
| | | | 415/162 |
| 2016/0333796 A1* | 11/2016 | Hugon | F01D 5/087 |
| 2017/0175557 A1 | 6/2017 | Chouhan et al. | |
| 2018/0112539 A1* | 4/2018 | Weber | F01D 9/041 |
| 2018/0306042 A1* | 10/2018 | Zaccardi | F02K 3/115 |

FOREIGN PATENT DOCUMENTS

| | | |
|---|---|---|
| EP | 3156592 A1 | 4/2017 |
| EP | 3231994 A1 | 10/2017 |

OTHER PUBLICATIONS

International Search Report and Written Opinion on corresponding PCT application (PCT/EP2019/059847) from International Searching Authority (EPO) dated Jul. 4, 2019.

\* cited by examiner

TURBOMACHINE COMPRISING AN AIR COLLECTION CIRCUIT

TECHNICAL FIELD

The present invention relates to a turbomachine comprising an air collection circuit.

In a known manner, with reference to FIG. 1, a turbomachine T extends longitudinally along an X axis and enables the circulation of an air stream F from upstream to downstream in a main duct V of annular shape. Hereafter, the terms "upstream" and "downstream" are defined with respect to the X axis oriented from upstream to downstream. The terms "longitudinal" and "radial" are defined with respect to the X axis, the term radial being more specifically defined in a plane transversal to the X axis. Similarly, the terms "inner" and "outer" are defined radially with respect to the X axis.

The turbomachine T comprises a compressor 100, a combustion chamber and a turbine in which the air stream F circulates from upstream to downstream. The compressor 100 comprises in a known manner a plurality of compressor discs. As illustrated in FIG. 2, the turbomachine comprises an air collection circuit formed between an upstream compressor disc 1A and a downstream compressor disc 1B. Each compressor disc 1A, 1B comprises vanes 10 extending radially to accelerate/compress the air stream F in the main duct V. The downstream compressor disc 1B comprises a cylindrical shell 11 connected to the upstream compressor disc 1A. The cylindrical shell 11 comprises a plurality of input orifices 12 in such a way that a collected air stream $F_p$, coming from the air stream F of the main duct V, circulates internally in the cylindrical shell 11 between the upstream compressor disc 1A and the downstream compressor disc 1B.

The downstream compressor disc 1B comprises a central bore 13 into which extends a cylindrical body 2 along the X axis, known to those skilled in the art under the designation of "tie-rod", which is connected to the upstream compressor disc 1A as represented in FIG. 2. The cylindrical body 2 is rotationally driven around the X axis and makes it possible to rotationally drive the compressor discs 1A, 1B of the compressor 100.

The air collection circuit comprises, on the one hand, a radial portion $CP_1$ extending between the upstream compressor disc 1A and the downstream compressor disc 1B and, on the other hand, a longitudinal portion $CP_2$ extending between the cylindrical body 2 and the central bore 13 of the downstream compressor disc 1B. In a known manner, the collected air stream $F_p$ circulates in the radial portion $CP_1$ in a centripetal manner then longitudinally downstream in the longitudinal portion $CP_2$ to be conveyed, for example, to the turbine of the turbomachine in order to enable a cooling or a purge of certain cavities. Such an air collection circuit is known to those skilled in the art under the designation "under disc" collection.

In practice, in the radial portion CP1, the collected air stream $F_p$ is analogous to a flow known to those skilled in the art under the designation "free vortex". The collected air stream $F_p$ is free to accelerate and undergoes a strong tangential acceleration and an associated strong head loss.

To eliminate this drawback, it has been proposed to mount air collection tubes 4 in the radial portion CP1 of the air collection circuit to guide the collected air stream $F_p$ and to impose thereon a tangential speed equal to that of the compressor discs 1A, 1B. Such air collection tubes 4 are for example taught by the patent application EP1262630A1.

In a known manner, as illustrated in FIG. 2, an air collection tube 4 comprises an inner end 40 which is radially offset with respect to the central bore 13 of the downstream compressor disc 1B in order to reserve sufficient space for the link between the cylindrical body 2 and the upstream compressor disc 1A. In this example, with reference to FIG. 3, the upstream compressor disc 1A comprises a linking member 14 extending downstream and cooperating with a linking member 21 of the cylindrical body 2. Due to this radial offset $\Delta R$, when the collected air stream $F_p$ comes out of an air collection tube 4, it is free to accelerate tangentially before reaching the longitudinal portion $CP_2$ of the collection circuit, which induces significant head losses PC as illustrated in FIG. 3. In practice, the tangential speed of the collected air stream $F_p$ may be up to two times greater than the tangential speed of the downstream compressor disc 1B.

In order to eliminate this drawback, an immediate solution could be to do away with the radial offset $\Delta R$ but this would impose modifying in a significant manner the shape of the air collection circuit for an uncertain result.

One of the objectives of the present invention is to realize a collection of air in a turbomachine which makes it possible to reduce head losses while limiting structural modifications of the air collection circuit.

In an incident manner, the document EP231994A1 is known in the prior art which comprises an axial compressor configured to collect air in a main duct and to inject it into a cooling circuit. Such a document does not relate to an architecture comprising a downstream compressor disc comprising a central bore in which air circulates. In addition, such a document does not target an air collection tube for conveying air up to the central bore.

SUMMARY

To this end, the invention relates to a turbomachine extending longitudinally along an X axis and comprising a main duct in which an air stream circulates from upstream to downstream, the turbomachine comprising a compressor comprising at least one upstream compressor disc, at least one downstream compressor disc and a circuit for collecting air from an air stream collected in the main duct, the downstream compressor disc comprising a central bore and a cylindrical shell comprising a plurality of input orifices of the air collection circuit, the turbomachine comprising a cylindrical body extending into the central bore of the downstream compressor disc and integrally connected to the upstream compressor disc, the air collection circuit comprising a radial portion, extending between the upstream compressor disc and the downstream compressor disc, in which is mounted at least one air collection tube and a longitudinal portion extending between the cylindrical body and the central bore.

The invention is remarkable in that the turbomachine comprises a plurality of blades extending into the longitudinal portion of the air collection circuit to rotationally drive the collected air stream.

Thanks to the invention, the blades make it possible to control the tangential speed of the collected air stream. Any uncontrolled acceleration of the collected air stream is thus avoided, which makes it possible to reduce head losses. The angular rotation speed of the blades is advantageously equal to that of the compressor discs. The addition of blades is advantageous given that it only slightly impacts the structure of the air collection circuit. Moreover, the mass of such blades is reduced. The blades are rotationally driven around the X axis of the turbomachine.

In an advantageous manner, the blades fulfil a function analogous to the air collection tube mounted in the radial portion of the air collection circuit but have a different structure to enable integration in a longitudinal portion of the air collection circuit. The integration of blades requires an acute understanding of the physical mechanisms of an air collection circuit but also requires an inventive approach.

In a preferred manner, the cylindrical body comprises the plurality of blades. The blades are thus rotationally integral with the cylindrical body. Thus, the blades make it possible to control the tangential speed of the collected air stream. The angular rotational speed of the blades is advantageously equal to that of the compressor discs. The formation of blades on the cylindrical body is advantageous given that is does not impact the compressor discs. In addition, blades may advantageously be added onto an existing cylindrical body of which the structure is simpler.

According to a preferred aspect, the longitudinal portion of the air collection circuit having a determined radial height H, each blade has a radial height Ha defined according to the following formula: Ha>0.8*H.

Such a characteristic makes it possible to avoid the formation of an important radial clearance in which the collected air stream is free to accelerate tangentially. A radial height greater than 80% enables an optimal regulation of the tangential speed and an efficient limitation of head losses.

Preferably, the plurality of input orifices defines an overall input section S1, the longitudinal portion of the air collection circuit has an air passage section S2 greater than two times the input section S1, that is to say, S2>2*S1.

Such a ratio of sections makes it possible to limit head losses induced by the circulation of the collected air stream between the blades. In other words, no additional head loss is induced by the addition of the blades.

In a preferred manner, each compressor disc comprises radial vanes extending into the main duct to accelerate the air stream.

Preferably, the plurality of blades is distributed on the periphery of the cylindrical body. Thus, the speed of the collected air stream is controlled in a homogeneous manner by the blades.

According to an aspect of the invention, the cylindrical body comprises a linking member connected to the upstream compressor disc. Preferably, the plurality of blades extend downstream of the linking member of the cylindrical body. In a preferred manner, the upstream compressor disc comprising a linking member connected to the cylindrical body, the plurality of blades extends substantially into the extension of the linking member of the upstream compressor disc. Thus, head losses induced by the link between the cylindrical body and the upstream compressor disc are advantageously reduced by the blades.

In a preferred manner, the air collection tube comprises a radially inner end offset radially outwards with respect to the central bore of the downstream compressor disc. Thus, the blades make it possible to guide the collected air stream in an optimal manner following its tangential acceleration at the outlet of the air collection tube.

The invention also relates to a method for collecting an air stream in a turbomachine such as described previously, the method comprising:
- a step of circulation of a collected air stream from the main duct to the radial portion of the air collection circuit,
- a step of circulation of the collected air stream from the radial portion of the air collection circuit to the longitudinal portion of the air collection circuit, and
- a step of rotationally driving the collected air stream into the longitudinal portion of the air collection circuit by the plurality of blades.

In a preferred manner, the collected air stream is rotationally driven at the rotational speed of the cylindrical body.

BRIEF DESCRIPTION OF THE DRAWINGS

The invention will be better understood on reading the description that follows, given uniquely as an example, and by referring to the appended drawings in which.

It should be noted that the figures set out the invention in a detailed manner for implementing the invention, said figures obviously being able to serve to better define the invention if need be.

DETAILED DESCRIPTION

Figure 1:
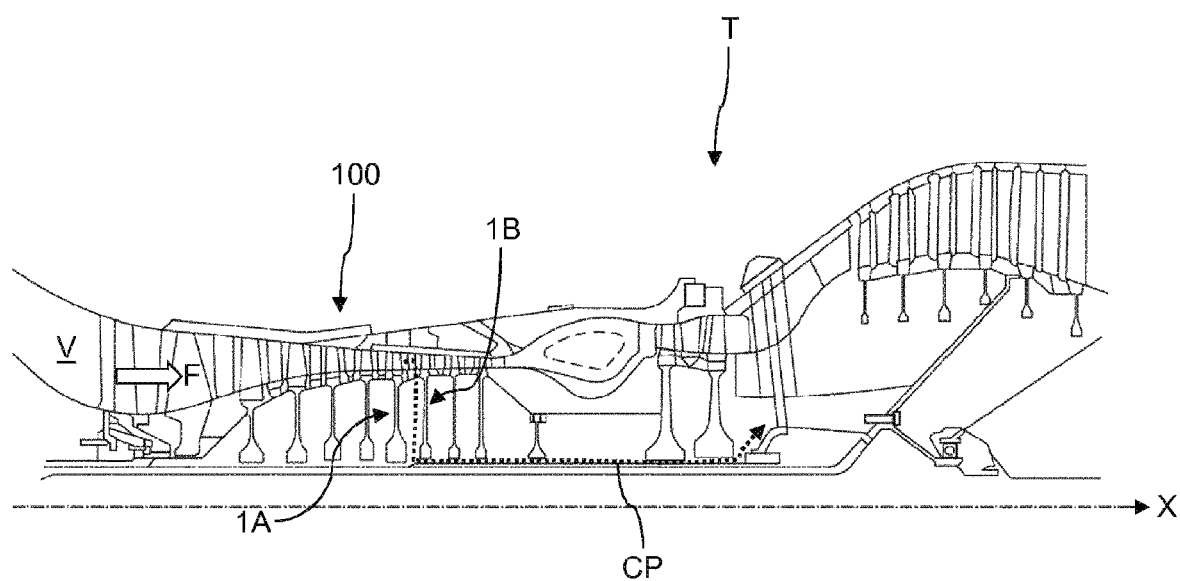
FIG. 1 is a representation in longitudinal section of a turbomachine comprising an air collection circuit according to the prior art.
Figure 2:
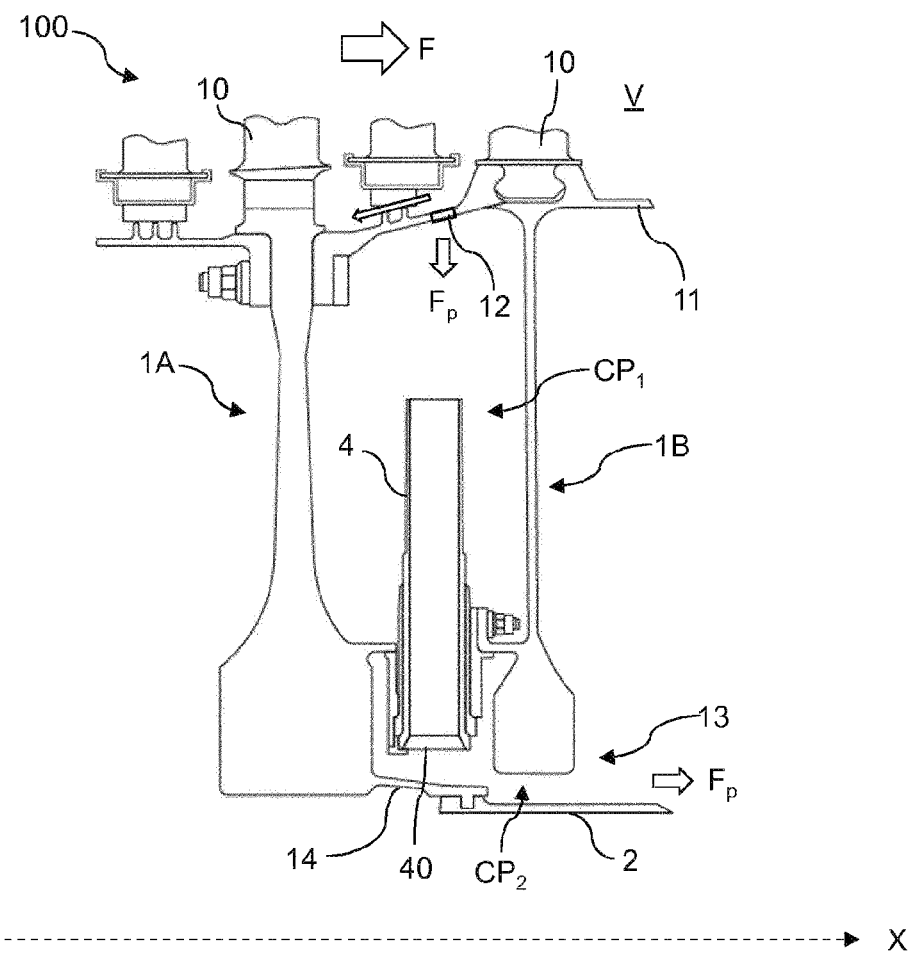
FIG. 2 is a close-up representation in longitudinal section of a turbomachine comprising an air collection circuit according to the prior art.
Figure 3:
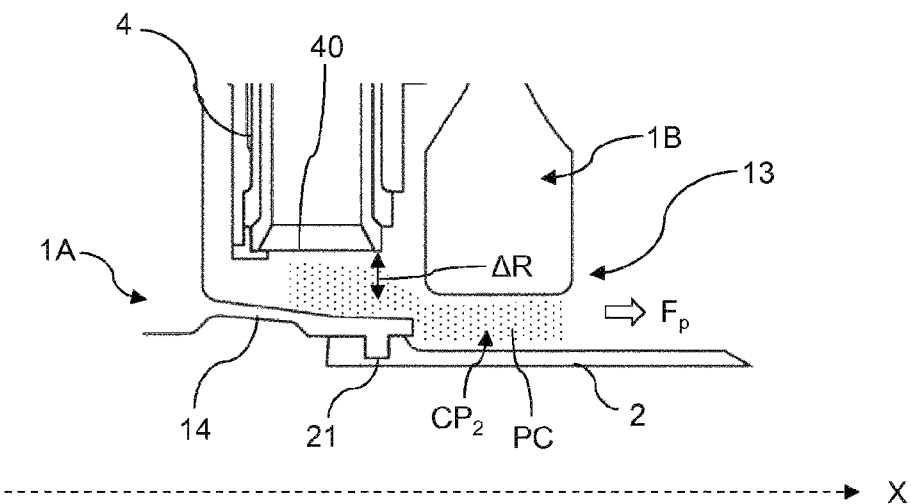
FIG. 3 is an enlarged representation of the air collection circuit of FIG. 2.
Figure 4:
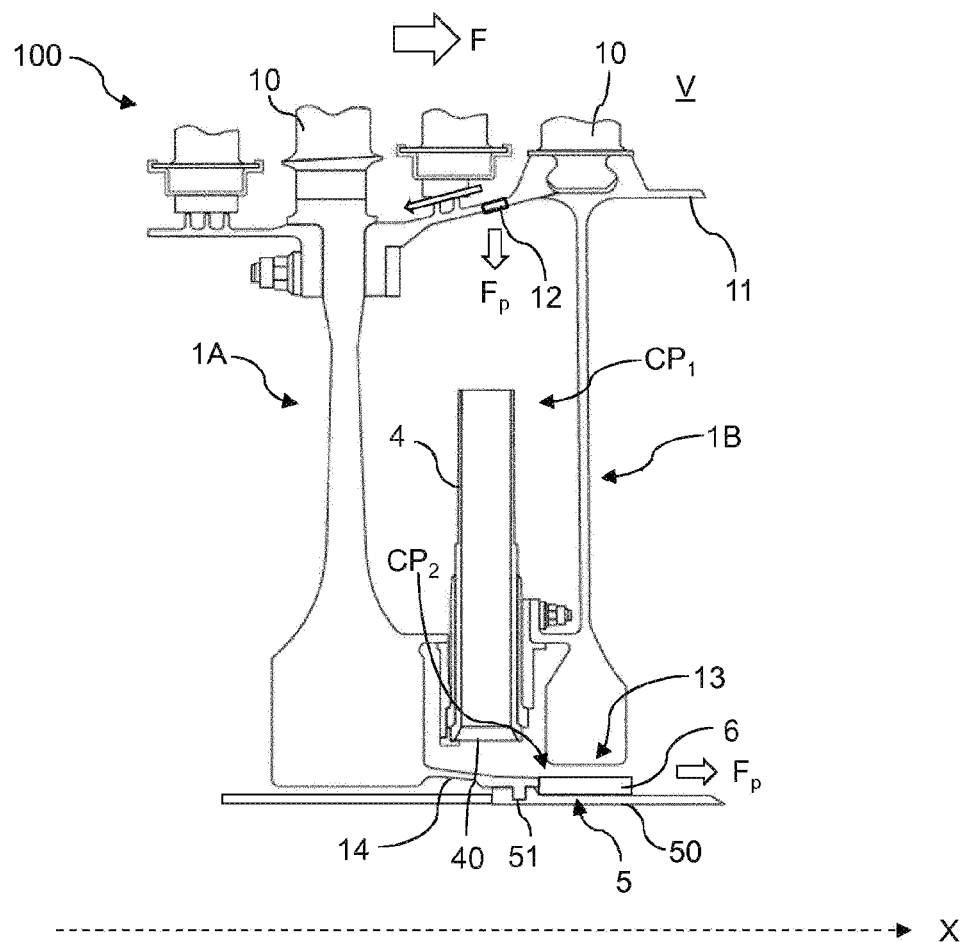
FIG. 4 is a representation in longitudinal section of a turbomachine comprising an air collection circuit according to an embodiment of the invention.

With reference to FIG. 4, a turbomachine with an air collection circuit is represented according to an embodiment of the invention.

As described previously, the turbomachine extending longitudinally along an X axis and comprises a main duct V in which an air stream F circulates from upstream to downstream. Hereafter, the terms "upstream" and "downstream" are defined with respect to the X axis oriented from upstream to downstream. The terms "longitudinal" and "radial" are defined with respect to the X axis, the term radial being more precisely defined in a plane transversal to the X axis. Similarly, the terms "inner" and "outer" are defined radially with respect to the X axis.

In this example, the turbomachine comprises, from upstream to downstream, a compressor 100, a combustion chamber and a turbine.

In a known manner, with reference to FIG. 4, the compressor 100 comprises an upstream compressor disc 1A, a downstream compressor disc 1B and a circuit for collecting air from an air stream $F_p$ collected in the air stream F of the main duct V. In this exemplary embodiment, the air collection circuit makes it possible to collect an air stream at the level of the compressor 100 in order to convey it to the turbine. However, it goes without saying that the collected air stream could be conveyed to difference places.

Each compressor disc 1A, 1B comprises radial vanes 10 extending into the main duct V to accelerate the air stream F. The downstream compressor disc 1B comprises a central bore 13 and a cylindrical shell 11 comprising a plurality of input orifices 12 of the air collection circuit. The cylindrical shell 11 is connected to the upstream compressor disc 1A, in particular, by bolting. The compressor discs 1A, 1B are rotationally integral around the X axis. The input orifices 12 are preferably distributed on the periphery of the cylindrical shell 11.

Figure 6:
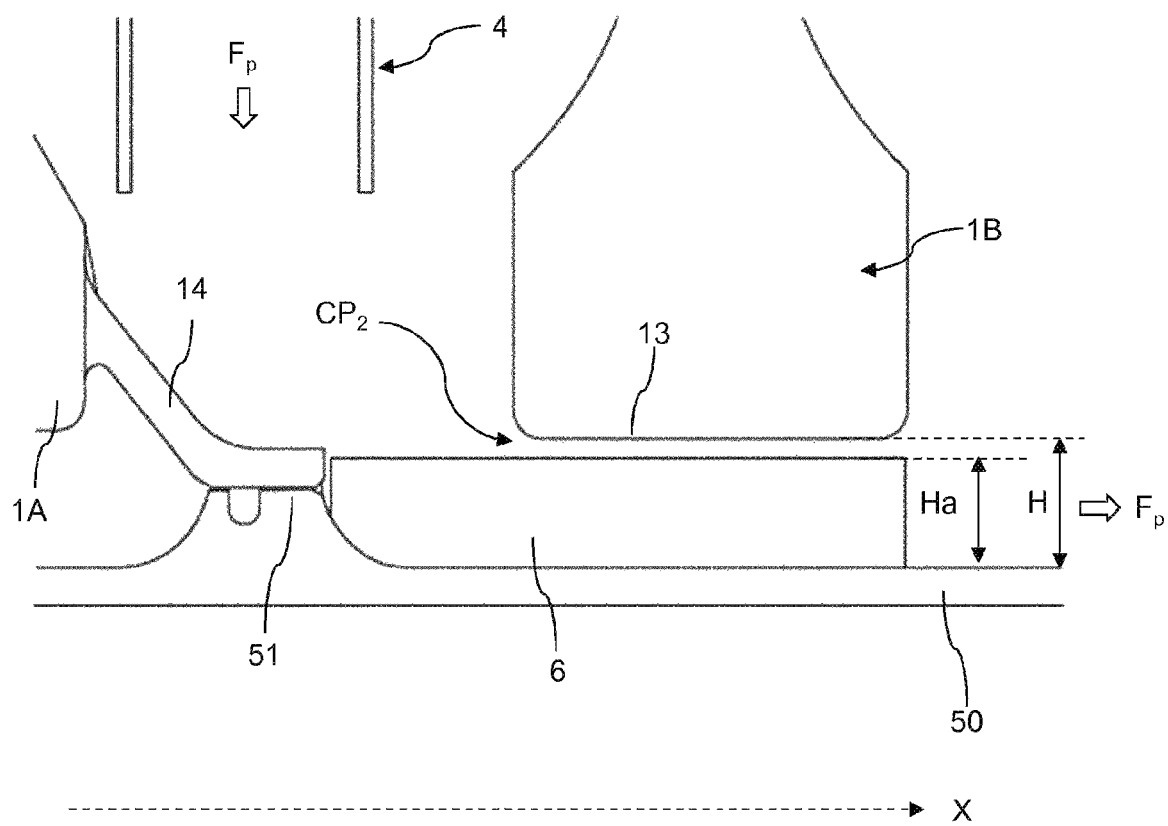
FIG. 6 is an enlarged representation of the air collection circuit of FIG. 4.

Still with reference to FIG. 4, the turbomachine comprises a cylindrical body 5 extending into the central bore 13 of the downstream compressor disc 1B. Such a cylindrical body 5 is known to those skilled in the art under the designation "tie-rod". The cylindrical body 5 comprises an outer surface 50 and a linking member 51 configured to be connected to the upstream compressor disc 1A in order to rotationally drive it around the X axis. In this example, the upstream compressor disc 1A comprises a linking member 14, of cylindrical shape, which extends downstream and which is connected to the linking member 51 of the cylindrical body 5 as illustrated in FIG. 6.

With reference to FIG. 4, the air collection circuit comprises a radial portion $CP_1$ in which is mounted a plurality of air collection tubes 4 and a longitudinal portion $CP_2$ extending between the cylindrical body 5 and the central bore 13 of the downstream compressor disc 1B. In other words, the collected air stream $F_p$ can circulate in the air collection tubes 4 then internally to the central bore 13 of the downstream compressor disc 1B and externally to the cylindrical body 5.

In this example, each air collection tube 4 comprises an inner end 40 which is offset radially outwards with respect to the longitudinal portion $CP_2$ of the air collection circuit.

According to the invention, the turbomachine comprises a plurality of blades 6 extending into the longitudinal portion CP2 of the air collection circuit to rotationally drive the collected air stream $F_p$. Thus, the collected air stream $F_p$ is tangentially driven to limit head losses at the outlet of the air collection tube 4.

Figure 5:
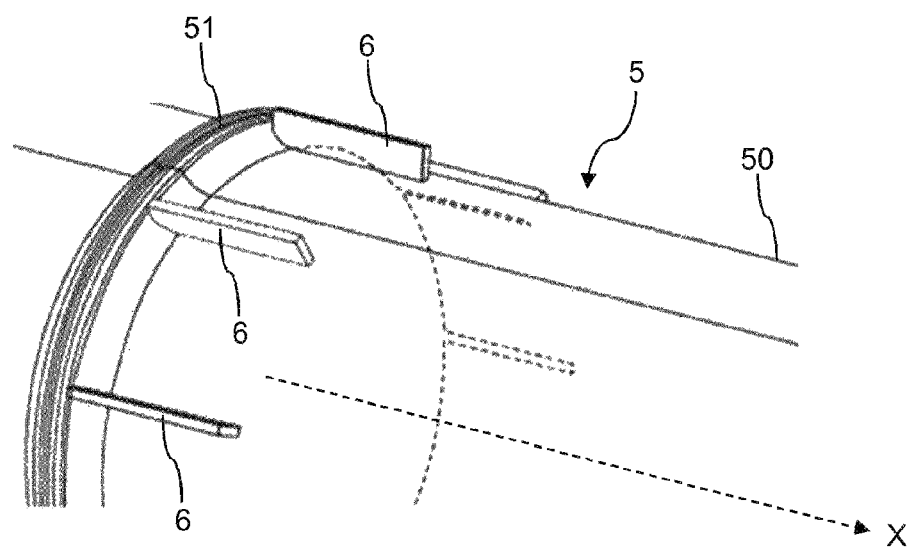
FIG. 5 is a schematic representation of a cylindrical body of the turbomachine of FIG. 4

With reference to FIGS. 4 and 5, the blades 6 extend radially outwards from the outer surface 50 of the cylindrical body 5. The blades 6 extend downstream of the linking member 51 of the cylindrical body 5 and are distributed on the periphery of the cylindrical body 5 so as to drive the collected air stream $F_p$ at the tangential speed of the compressor discs 1A, 1B. The blades 6 are rotationally driven around the X axis of the turbomachine. In this example, the blades 6 extend substantially into the extension of the linking member 14 of the upstream compressor disc 1A. As illustrated in FIG. 6, the radially outer surfaces of the linking members 14 and the blades 6 are aligned longitudinally.

As illustrated in FIG. 6 representing a blade 6 in a close-up manner, each blade 6 has a longitudinal length greater than the longitudinal length of the bore 13 of the downstream compressor disc 1B. Thus, the collected air stream $F_p$ is guided and driven in an optimal manner in the whole of the longitudinal portion $CP_2$ of the air collection circuit. However, it goes without saying that a blade 6 having a longitudinal length greater than 50% of the bore 13 could also be suitable.

In this embodiment, each blade 6 has a general rectangular shape defining a large side (or length) extending longitudinally and a small side (or height) extending radially with respect to the X axis. The thickness of each blade 6 is less than the dimension of its small side. In a preferred manner, each blade 6 has a constant thickness over its length.

The longitudinal portion $CP_2$ of the air collection circuit has a determined radial height H, defined between the outer surface 50 of the cylindrical body 5 and the inner surface of the central bore 13 of the downstream compressor disc 1B. Each blade 6 has a radial height Ha defined according to the following formula: Ha>0.8*H. In other words, each blade 6 occupies at least 80% of the height of the longitudinal portion $CP_2$ of the air collection circuit. Such a characteristic is particularly advantageous given that it makes it possible to limit the radial clearance between the blades 6 and the central bore 13. Such blades 6 make it possible to limit in an efficient manner a tangential acceleration of the collected air stream $F_p$.

According to another aspect, the input orifices 12, formed in the cylindrical shell 11 of the downstream compressor disc 1B, together define an overall input section S1 which corresponds to the sum of the elementary sections of each input orifice 12. In a preferred manner, the longitudinal portion $CP_2$ of the air collection circuit has an air passage section S2 which is greater than two times the overall input section S1. This advantageously makes it possible to avoid additional head losses during the circulation of the collected air stream $F_p$ between the blades 6.

Advantageously, thanks to the invention, head losses in the air collection circuit may be reduced in a significant manner without important structural modification. Indeed, only the moveable blades 6 are added to the turbomachine without impacting the other elements of the turbomachine. The position and the dimensions of the blades 6 are determined judiciously to reduce head losses in an optimal manner without however impacting the performances of the air collection circuit. The addition of blades 6 on the outer surface 50 of the cylindrical body 5 is simple to carry out.

According to another aspect of the invention, the blades 6 extend radially inwards from an inner surface of the central bore 13 of the downstream compressor disc 1B. In other words, the blades 6 are no longer formed externally on the cylindrical body 5 but internally to the central bore 13 of the downstream compressor disc 1B. Such blades 6 advantageously make it possible to drive the collected air stream $F_p$ tangentially in the longitudinal portion $CP_2$ of the air collection circuit to limit head losses. Although this technical solution is functional, it is nevertheless preferred to form the blades 6 on the cylindrical body 5 in order to limit structural modifications.

An exemplary embodiment of a method for collecting an air stream in a turbomachine will henceforth be described with reference to FIG. 4.

The method comprises a step of circulation of a collected air stream $F_p$ from the main duct V to the radial portion $CP_1$ of the air collection circuit via the input orifices 12 of the shell 11. Then, the method comprises a step of circulation of the collected air stream $F_p$ from the radial portion $CP_1$ of the air collection circuit to the longitudinal portion $CP_2$ of the air collection circuit via the air collection tube 4. The method further comprises a step of rotationally driving the collected air stream $F_p$ in the longitudinal portion $CP_2$ of the air collection circuit by the plurality of blades 6. During the rotation of the blades 6 around the X axis, the collected air stream $F_p$ is driven at the tangential speed of the compressor discs 1A, 1B. Head losses are then greatly reduced.

The invention claimed is:

1. A turbomachine extending longitudinally along an X axis and comprising a main duct in which an air stream circulates from upstream to downstream, the turbomachine comprising a compressor comprising at least one upstream compressor disc, at least one downstream compressor disc and a circuit for collecting air from an air stream collected in the main duct, the downstream compressor disc comprising a central bore and a cylindrical shell comprising a plurality of input orifices of the air collection circuit, the turbomachine comprising a cylindrical body extending into the central bore of the downstream compressor disc and integrally connected to the upstream compressor disc, the air collection circuit comprising a radial portion, extending between the upstream compressor disc and the downstream compressor disc, in which is mounted at least one air collection tube and a longitudinal portion extending between the cylindrical body and the central bore, turbomachine comprising a plurality of blades extending into the longitudinal portion of the air collection circuit, configured to be rotationally driven around the X axis, to rotationally drive the collected air stream.

2. The turbomachine according to claim 1, in which the cylindrical body comprises the plurality of blades.

3. The turbomachine according to claim 1, in which the longitudinal portion of the air collection circuit having a determined radial height H, each blade has a radial height Ha defined according to the following formula:

$$Ha > 0.8*H.$$

4. The turbomachine according to claim 1, in which the plurality of input orifices defines an overall input section S1, the longitudinal portion of the air collection circuit has an air passage section S2 greater than two times the input section S1.

5. The turbomachine according to claim 1, in which the plurality of blades is distributed on the periphery of the cylindrical body.

6. The turbomachine according to claim 1, in which the cylindrical body comprises a linking member connected to the upstream compressor disc.

7. The turbomachine according to claim 6, in which the plurality of blades extends downstream of the linking member of the cylindrical body.

8. The turbomachine according to claim 1, in which, the upstream compressor disc comprising a linking member connected to the cylindrical body, the plurality of blades extend substantially into the extension of the linking member of the upstream compressor disc.

9. The turbomachine according to claim 1, in which the air collection tube comprises a radially inner end offset radially outwards with respect to the central bore of the downstream compressor disc.

10. A method for collecting an air stream in the turbomachine according to claim 1, the method comprising:
 a. a step of circulation of a collected air stream from the main duct to the radial portion of the air collection circuit,
 b. a step of circulation of the collected air stream from the radial portion of the air collection circuit to the longitudinal portion of the air collection circuit, and
 c. a step of rotationally driving the collected air stream in the longitudinal portion of the air collection circuit by the plurality of blades.

* * * * *